United States Patent
Byun et al.

(10) Patent No.: US 8,928,525 B2
(45) Date of Patent: Jan. 6, 2015

(54) ADAPTIVE HIGH SPEED/HIGH RESOLUTION 3D IMAGE RECONSTRUCTION METHOD FOR ANY MEASUREMENT DISTANCE

(75) Inventors: Woo Jin Byun, Daejeon (KR); Yong Heui Cho, Daejeon (KR); Kwang Seon Kim, Daejeon (KR); Min Soo Kang, Daejeon (KR); Bong Su Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 498 days.

(21) Appl. No.: 13/326,618

(22) Filed: Dec. 15, 2011

(65) Prior Publication Data
US 2012/0155746 A1    Jun. 21, 2012

(30) Foreign Application Priority Data
Dec. 15, 2010    (KR) .................. 10-2010-0128530

(51) Int. Cl.
*G01S 13/00*    (2006.01)
*G06T 7/00*    (2006.01)

(52) U.S. Cl.
CPC .................. *G06T 7/0065* (2013.01)
USPC .......................... 342/195; 342/22

(58) Field of Classification Search
USPC ................................. 342/22, 195
See application file for complete search history.

(56) References Cited

U.S. PATENT DOCUMENTS

| | | | |
|---|---|---|---|
| 5,394,151 A | 2/1995 | Knaell et al. | |
| 5,859,609 A | 1/1999 | Sheen et al. | |
| 2005/0162528 A1* | 7/2005 | Nagano et al. | 348/218.1 |
| 2008/0291077 A1* | 11/2008 | Chang | 342/59 |

FOREIGN PATENT DOCUMENTS

KR    101998014140 A    5/1998

OTHER PUBLICATIONS

David M. Sheen et al., Three-Dimensional Millimeter-Wave Imaging for Concealed Weapon Detection, IEEE Transactions on MTT, Sep. 2001, pp. 1581-1592, vol. 49, No. 9.

* cited by examiner

*Primary Examiner* — Timothy A Brainard
(74) *Attorney, Agent, or Firm* — William Park & Associates Patent Ltd.

(57) ABSTRACT

Disclosed is a method for performing a 3D image reconstruction at a high speed and high resolution, regardless of a measurement distance. Specifically, a weight for image reconstruction is previously set, and a 3D image reconstruction algorithm is performed at a high speed, without reducing a resolution, by a parallel processing for image reconstruction, a computation of a partial region using a database based on a measurement result, and a generation of a variable pulse waveform.

5 Claims, 6 Drawing Sheets

ADAPTIVE HIGH SPEED/HIGH RESOLUTION 3D IMAGE RECONSTRUCTION METHOD FOR ANY MEASUREMENT DISTANCE

CROSS-REFERENCE TO RELATED APPLICATIONS

This application is based on and claims priority from Korean Patent Application No. 10-2010-0128530, filed on Dec. 15, 2010 with the Korean Intellectual Property Office, the disclosure of which is incorporated herein in its entirety by reference.

TECHNICAL FIELD

The present disclosure relates to an image reconstruction method, and more particularly, to an adaptive high speed/high resolution three-dimensional (3D) image reconstruction method which is operated at any measurement distance by using a weight for image reconstruction, such that the image reconstruction method is operated in ultrahigh frequency/millimeter wave/terahertz frequency bands.

BACKGROUND

Recently, research into 3D image reconstruction application algorithms using ultrahigh frequency/millimeter wave/terahertz frequency, and so on, has been rapidly conducted. Due to features of electromagnetic waves, an electromagnetic wave scattered from a target object has a variety of geometric/physical features of the target object. However, due to the scattering feature of the electromagnetic wave, amplitude or phase of a received scattered electromagnetic wave is not direct 3D image of the target object.

An image reconstruction method refers to a method that reconfigures a received scattered electromagnetic wave using an algorithm and three-dimensionally finds geometric/physical features of a target object. A 3D image reconstruction belongs to a very mathematically difficult field among electromagnetic technology fields. In order to perform a 3D image reconstruction, an integral equation including scattering needs to be solved based on a numerical analysis.

Meanwhile, since the numerical analysis of the integral equation is very time-consuming in computation, a far-field approximation is forcibly applied such that the numerical analysis is applicable to a Fast Fourier Transform (FFT) algorithm having a fast computation time. In this case, in order for exact application of the FFT algorithm, a measurement distance between an electromagnetic wave transmitting/receiving unit and a target object needs to be longer than a wavelength of an electromagnetic wave. If the measurement distance is short, image reconstruction accuracy is lowered due to a far-field approximation error.

Measurement values may not be obtained periodically, depending on a method of measuring a scattered electromagnetic wave. Therefore, an interpolation is additionally applied to obtain periodic measurement values. This is because a high-speed FFT is applicable only when the measurement values are periodic. However, due to the application of the interpolation, a converted value based on the measurement value is used as an input of the FFT. Therefore, an image reconstruction resolution of a 3D target object may be lowered.

In order to perform a 3D image reconstruction at a high speed and high resolution with respect to any measurement distance, it is necessary to solve an integral equation for inverse scattering exactly and quickly, without far-field approximation. Therefore, there is a strong need for high resolution image reconstruction technologies based on an analytic integral equation solution, and high speed image reconstruction technologies using no FFT.

SUMMARY

The present disclosure has been made in an effort to provide an adaptive high speed/high resolution 3D image reconstruction method for any measurement distance, which is capable of reconstructing a 3D image at a high speed and a high resolution. In the adaptive high speed/high resolution 3D image reconstruction method, a weight is set by exactly solving an integral equation for inverse scattering before a measurement of an electromagnetic wave scattering. After the measurement of the electromagnetic wave scattering, a measurement value is parallel-processed in each region through only a weight-based addition operation.

An exemplary embodiment of the present disclosure provides an adaptive high speed/high resolution 3D image reconstruction method for any measurement distance, including: setting a weight for image reconstruction by an image reconstruction position, a position of an ultrahigh frequency antenna, and a measurement frequency, which are previously determined before initiation of measurement; receiving a scattered electromagnetic wave from an object; removing background noise from the received scattered electromagnetic wave; performing a parallel processing on values measured by the scattered electromagnetic wave and the previously set weight for image reconstruction in each region on a measurement trajectory; and reconstructing a 3D image by combining values for the respective regions on which the parallel processing is performed.

Another exemplary embodiment of the present disclosure provides an adaptive high speed/high resolution 3D image reconstruction method for any measurement distance, including: setting a weight for image reconstruction by an image reconstruction position, a position of an ultrahigh frequency antenna, and a measurement frequency, which are previously determined before initiation of measurement; receiving a scattered electromagnetic wave from an object; removing background noise from the received scattered electromagnetic wave; determining partial regions (number of times of computation: MA), based on a measurement result database, among entire regions (number of times of computation: M) on a measurement trajectory, and performing a parallel processing on values measured by the scattered electromagnetic wave and the previously set weight for image reconstruction in each of the determined regions; and reconstructing a 3D image by combining values for the respective regions on which the parallel processing is performed.

According to exemplary embodiments of the present disclosure, a 3D image reconstruction algorithm using ultrahigh frequency/millimeter wave/terahertz frequency, and so on, application fields of which are expanding, may be performed at a high speed, without a resolution reduction.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Prior to description of the present disclosure, a general 3D image reconstruction method will be first described with reference to FIGS. 1 and 2.

Figure 1:
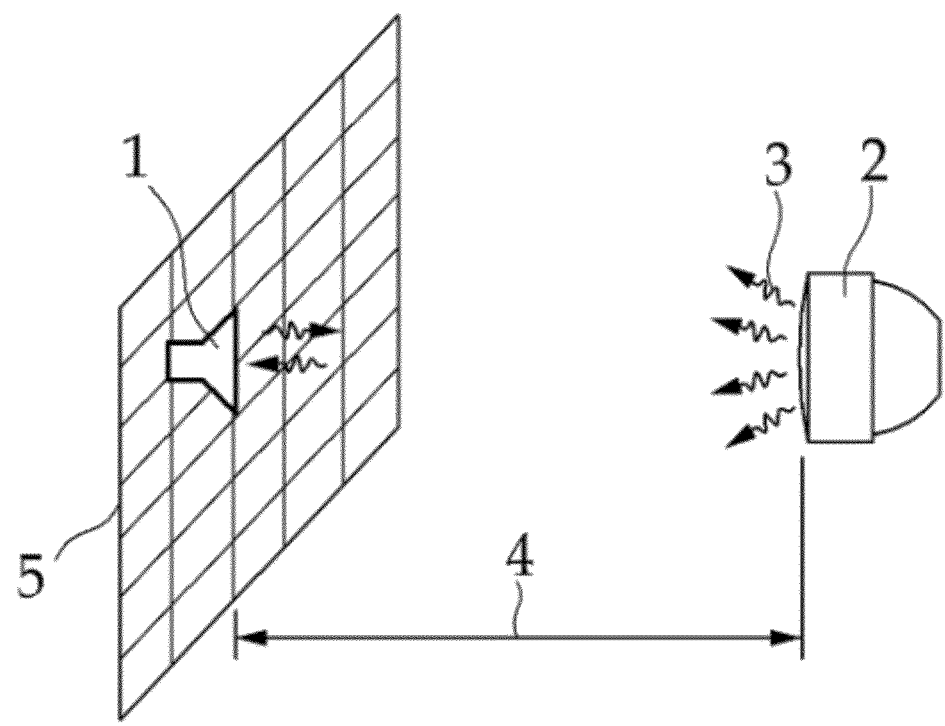
FIG. 1 is a view illustrating an example of an image reconstruction system based on an electromagnetic wave.

FIG. 1 is a view exemplarily illustrating an image reconstruction system based on an arbitrary planar measurement using an electromagnetic wave. When an electromagnetic wave is transmitted from an ultrahigh frequency antenna 1 installed for electromagnetic wave transmission and reception, the electromagnetic wave is scattered at a target object 2. A scattered electromagnetic wave 3 generated at the target object 2 may be received again by the ultrahigh frequency antenna 1. In this case, a transmit antenna and a receive antenna may be installed at the same position (monostatic), or may be installed at different positions (bistatic).

In general, a measurement distance 4 between the ultrahigh frequency antenna 1 and the target object 2 is required to be much longer than a wavelength in order for application of an FFT. In this case, a measurement trajectory 5, a path along which the ultrahigh frequency antenna 1 tracks for measurement, may be various. For example, the ultrahigh frequency antenna 1 may collect a scattered electromagnetic wave 3 along the measurement trajectory 5 of an orthogonal coordinate system, such as a rectangular coordinate system, a circular cylindrical coordinate system, a spherical coordinate system, and so on. A 3D image reconstruction is performed by signal-processing an amplitude and a phase of the received scattered electromagnetic wave 3.

Figure 2:
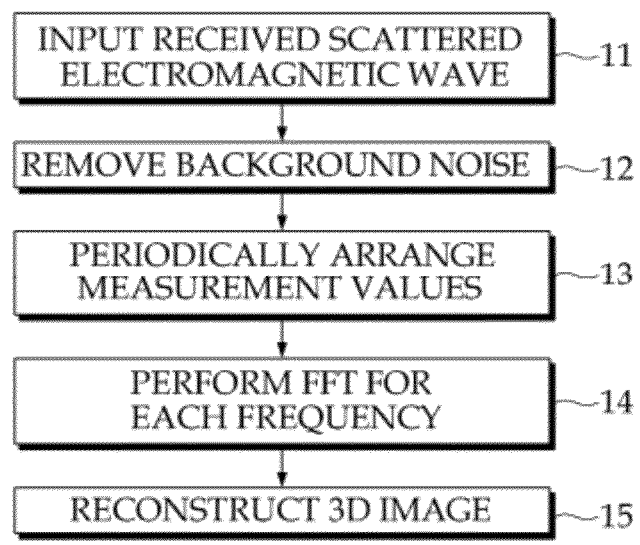
FIG. 2 is a flow chart illustrating a general 3D image reconstruction procedure.

FIG. 2 is a view exemplarily illustrating a general 3D image reconstruction algorithm. When a scattered electromagnetic wave received through the image reconstruction system exemplified in FIG. 1 is input (11), background noise generated by the image reconstruction system or ambient environment is removed from the received scattered electromagnetic wave (12) to recover a scattered electromagnetic wave generated at a target object 2.

In this case, in order for applying an FFT having a fast computation speed, measurement values are periodically arranged using an interpolation (13). A method of converting a frequency measurement value into a wave number conversion value, based on an interpolation, is essential to a 3D image reconstruction. However, this method is a key factor to lower an image reconstruction speed.

Meanwhile, measurement values in a wide frequency band are required for improving a depth resolution. In general, a given frequency band is not measured continuously, but is measured with respect to only a predetermined discrete frequency. Measurement values periodically arranged for each frequency are periodically arranged in a wavenumber domain using an interpolation, and are then FFT-processed for each frequency (14) to finally reconstruct a 3D image (15). In this case, due to features of the FFT, positions at which the 3D image is reconstructed need to have the same number and period as those of input values of the FFT.

Hereinafter, a 3D image reconstruction method according to an exemplary embodiment of the present disclosure will be described with reference to FIGS. 3 to 6.

Figure 3:
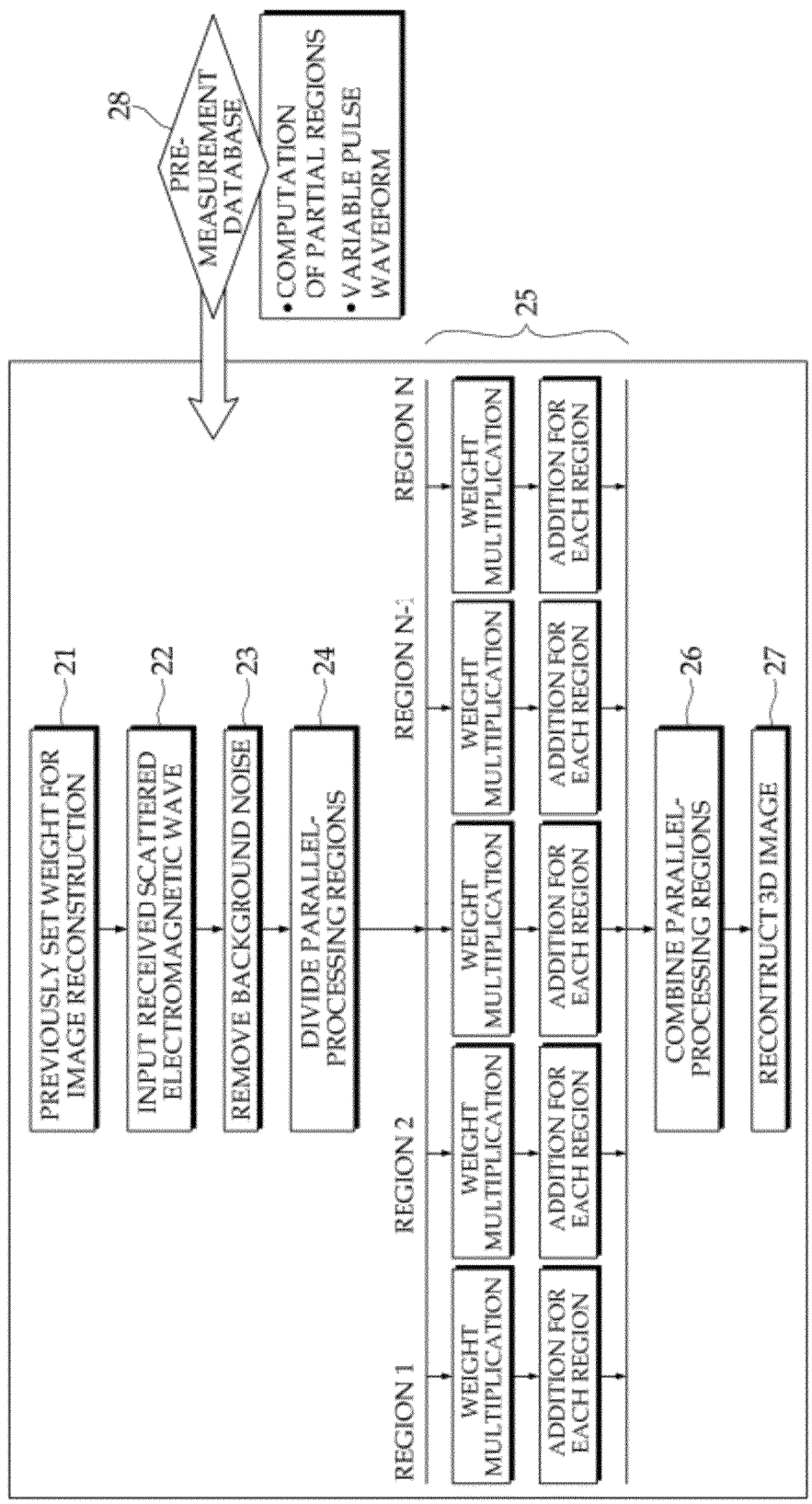
FIG. 3 is a flow chart illustrating an adaptive 3D image reconstruction method applicable to any measurement distance, according to an exemplary embodiment of the present disclosure.

FIG. 3 illustrates an adaptive 3D image reconstruction procedure applicable to any measurement distance according to an exemplary embodiment of the present disclosure. When compared with the above-described method of FIG. 2, the method of FIG. 3 according to the exemplary embodiment of the present disclosure is differentiated in terms of presetting a weight for image reconstruction (21), parallel-processing for image reconstruction (24, 25, 26), computing a partial region considering a resolution and a speed by using a database 28 based on a measurement result, and generating a variable pulse waveform.

Since the 3D image reconstruction is typically related to an inverse scattering, it is necessary to solve an integral equation for analytic inverse scattering, as described above. When a measurement frequency on the measurement trajectory 5 of FIG. 1 is $f_k$, the ultrahigh frequency antenna 1 performs a measurement. Therefore, a measurement value $f(\bar{r}_m, f_n)$ of a characteristic function $f(\bar{r})$ can be known only on a surface area formed by the measurement trajectory. Therefore, when the measurement trajectory is an orthogonal coordinate system, such as a rectangular coordinate system, a circular cylindrical coordinate system, or a spherical coordinate system, the image reconstruction characteristic function $f(\bar{r})$ may be calculated as Equation 1 below.

$$f(\bar{r}') = \sum_{k=1}^{K} \sum_{m=1}^{M} w_m(\bar{r}'\bar{r}_m, f_k) f(\bar{r}_m, f_k) \qquad \text{<Equation 1>}$$

In Equation 1 above, since an image reconstruction position $\bar{r}'$, a position $\bar{r}_m$ of an ultrahigh frequency antenna, a measurement frequency $f_k$ can be previously determined before the initiation of the measurement, a weight $w_m(\bar{r}', \bar{r}_m, f_k)$ for image reconstruction may be preset before the execution of the image reconstruction algorithm (21). There is no approximation in the weight for image reconstruction because the weight $w_m(\bar{r}', \bar{r}_m, f_k)$ for image reconstruction is obtained by solving the integral equation for inverse scattering analytically and exactly with respect to the measurement trajectory.

As such, after the weight for image reconstruction is set before the initiation of the measurement, the scattered electromagnetic wave is input (22) and background noise is removed (23). Then, in order to increase a computation speed when an image reconstruction is performed based on Equation 1 above, parallel processing (24, 25, 26) for image reconstruction is performed according to the exemplary embodiment of the present disclosure.

When the weight $w_m(\vec{r}, \vec{r}_m, f_k)$ for image reconstruction and the measurement value $f(\vec{r}_m, f_n)$ on the measurement trajectory are determined in Equation 1 above, a mathematical operation consisting of only multiplication and addition operations (25) is performed. Since such an operation structure is a simple multiplication and addition, the amount of computations for parallel processing may be easily divided based on the addition operation or the multiplication operation (24), and may be easily combined after the computation, based on the addition operation or the multiplication operation (26).

Therefore, the weight for image reconstruction according to the exemplary embodiment of the present disclosure is preset (21) and, due to the feature of Equation 1 above, a high speed image reconstruction computation can be performed even in the orthogonal coordinate system, such as a rectangular coordinate system, a circular cylindrical coordinate system, a spherical coordinate system, and so on, without periodically arranging the measurement values based on the general interpolation (13) and without using the FFT (14). The image reconstruction computation consists of only a simple multiplication and addition. Therefore, the parallel processing can be performed.

Unlike the general image reconstruction algorithm described above in detail with reference to FIG. 2, the image reconstruction position $\vec{r}$ may be freely set with an arbitrary number and period, regardless of the measurement values.

A 3D image reconstruction algorithm of FIG. 3 according to the exemplary embodiment of the present disclosure may establish a database 28 with the pre-measurement result and adaptively change a resolution and a computation speed.

Meanwhile, in order to increase the computation speed of the image reconstruction, an image of a corresponding position needs to be reconstructed with only a partial region adjacent to an image reconstruction position (MA<M, MA changes according to the image reconstruction position $\vec{r}$), rather than using a method of reconstructing an image using all measurement values (M of Equation 1) on the measurement trajectory. However, since MA<M, a resolution of the reconstructed image is more degraded than the case of MA=A. Therefore, the pre-measurement result database 28 may automatically determine an optimal value MA, and a corresponding partial region may be calculated using Equation 1, such that the image has a resolution/speed desired by a user.

If the weight $w_m(\vec{r}, \vec{r}_m, f_k)$ for the measurement frequency $f_k$ is changed in a frequency domain in a software or hardware fashion, a pulse form radiated by the ultrahigh frequency antenna may be adaptively changed in a time domain. Since an optimal pulse form capable of optimally increasing a resolution is different depending on a structure of a target object, a medium, or a driving frequency band, the frequency weight $w_m(\vec{r}, \vec{r}_m, f_k)$ may be automatically set using the pre-measurement result database.

Figure 4:
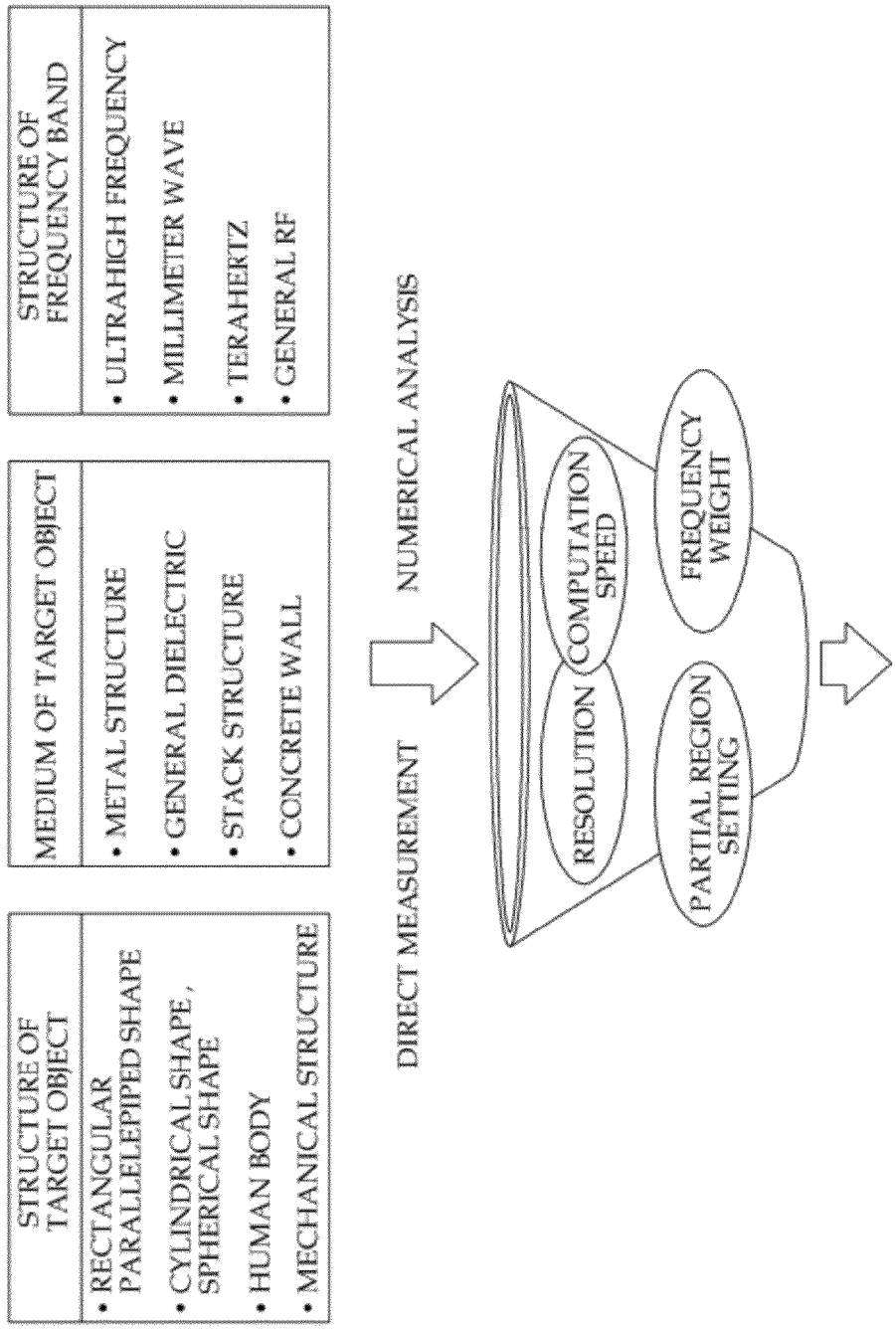
FIG. 4 is an explanatory view illustrating a method of establishing a pre-measurement result database in the adaptive 3D image reconstruction method, according to an exemplary embodiment of the present disclosure.

FIG. 4 illustrates a method of establishing a pre-measurement result database in the adaptive 3D image reconstruction method according to the exemplary embodiment of the present disclosure. In the case that features of a target object are given by previously performing each 3D image reconstruction according to features, such as a structure of a target object, a medium, or a driving frequency band, a pre-measurement result database optimally setting a resolution and a computation speed is established in terms of a partial region setting and a frequency weight.

In this case, if the structure of the target object is simple, the 3D image reconstruction is performed through a numerical analysis. If the structure of the target object is complicated, the 3D image is reconstructed through a direct measurement. An optimal image reconstruction factor may be previously determined, based on a required computation time and a resolution acquired through an actual image reconstruction. Meanwhile, if a partial region setting standard is changed, the image reconstruction speed and the resolution may be adaptively set according to features, such as the structure of the target object, the medium, or the driving frequency band.

While changing the weight for the measurement frequency in a software or hardware fashion in order to modify a variable pulse waveform, it is possible to find the frequency weight for obtaining an optical resolution and computation time according to the features, such as the structure of the target object, the medium, or the driving frequency band. Using a pre-measurement result database of FIG. 4 having already been established, a user may optimally set a resolution and a computation speed according to features of a given target object when executing the adaptive 3D image reconstruction algorithm of FIG. 3.

Figure 5:
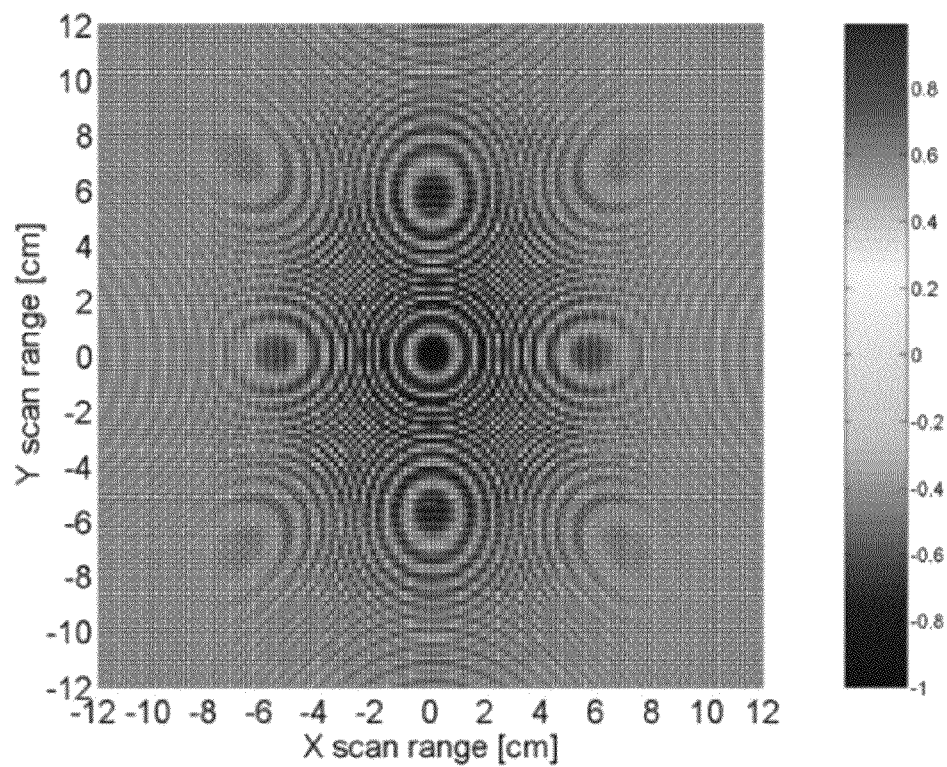
FIG. 5 is a view exemplarily illustrating a scattered wave of a metal sphere, which was measured along a plane measurement trajectory through an ultrahigh frequency antenna.
Figure 6:
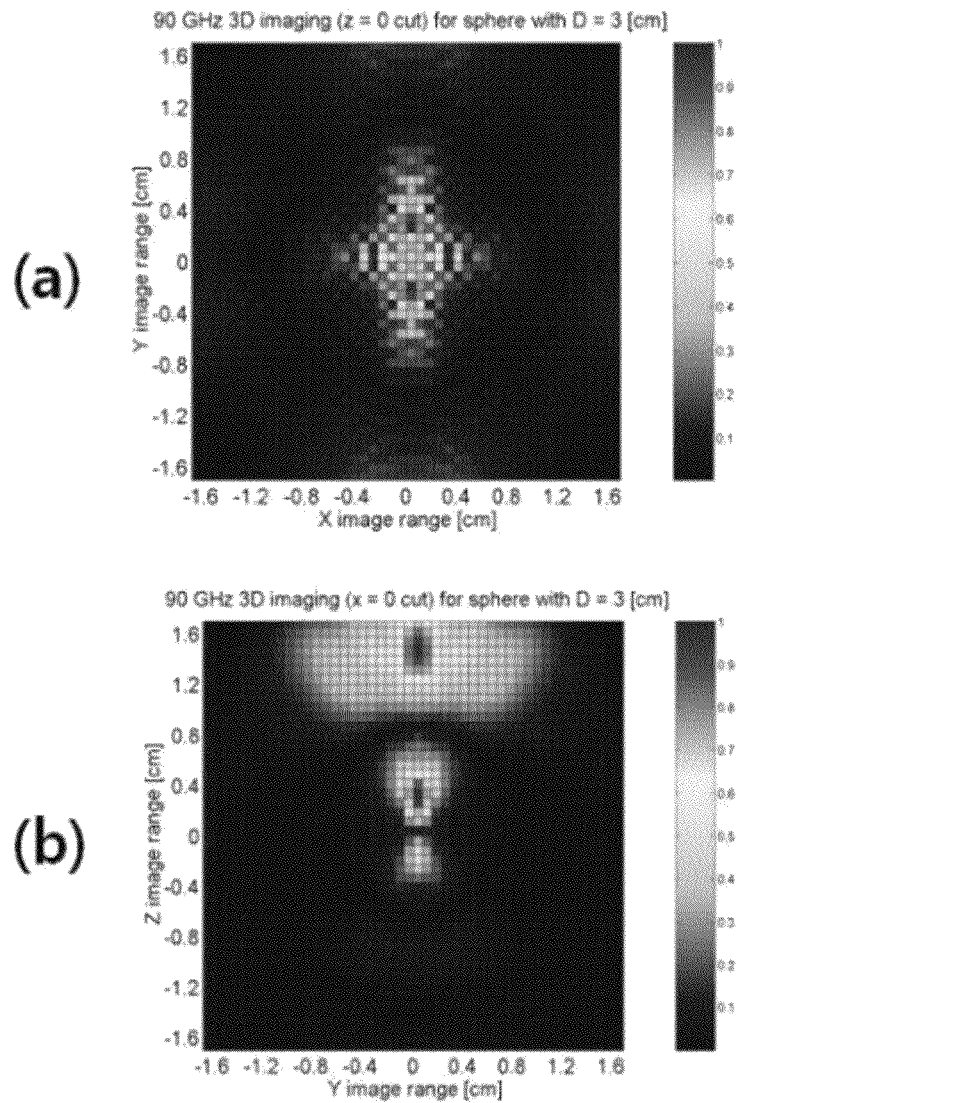
FIG. 6 is a view exemplarily illustrating a result of when an image of a 3D metal sphere is actually reconstructed based on a scattered wave by the adaptive 3D image reconstruction method according to the exemplary embodiment of the present disclosure.

FIG. 5 is a view exemplarily illustrating a scattered wave of a metal sphere, which was measured through an ultrahigh frequency antenna along a planar measurement trajectory. FIG. 6 is a view exemplarily illustrating a result of when an image of a 3D metal sphere is actually reconstructed based on a scattered wave by the adaptive 3D image reconstruction method according to the exemplary embodiment of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An adaptive high speed/high resolution 3D image reconstruction method for any measurement distance, comprising:
   setting a weight for image reconstruction by an image reconstruction position, a position of an ultrahigh frequency antenna, and a measurement frequency, which are previously determined before initiation of measurement;
   receiving a scattered electromagnetic wave from an object;
   removing background noise from the received scattered electromagnetic wave;
   performing a parallel processing on values measured by the scattered electromagnetic wave and the previously set weight for image reconstruction in each region on a measurement trajectory; and
   reconstructing a 3D image by combining values for the respective regions on which the parallel processing is performed.

2. The method of claim 1, wherein the parallel processing is performed by adding the products of the values measured by the scattered electromagnetic wave and the weight for image reconstruction at each measurement frequency.

3. An adaptive high speed/high resolution 3D image reconstruction method for any measurement distance, comprising:
   setting a weight for image reconstruction by an image reconstruction position, a position of an ultrahigh frequency antenna, and a measurement frequency, which are previously determined before initiation of measurement;
   receiving a scattered electromagnetic wave from an object;
   removing background noise from the received scattered electromagnetic wave;

determining partial regions (number of times of computation: MA), based on a measurement result database, among entire regions (number of times of computation: M) on a measurement trajectory, and performing a parallel processing on values measured by the scattered electromagnetic wave and the previously set weight for image reconstruction in each of the determined regions; and reconstructing a 3D image by combining values for the respective regions on which the parallel processing is performed.

4. The method of claim 3, wherein the measurement result database is established by previously performing 3D image reconstructions, respectively, according to features of a target object, including a structure of the target object, a medium, and a driving frequency band.

5. The method of claim 3, wherein a measurement frequency weight in the weight for image reconstruction is automatically set using the measurement result database.

* * * * *